(12) United States Patent
Parks et al.

(10) Patent No.: US 7,146,504 B2
(45) Date of Patent: Dec. 5, 2006

(54) SECURE CLOCK ON COMPUTING DEVICE SUCH AS MAY BE REQUIRED IN CONNECTION WITH A TRUST-BASED SYSTEM

(75) Inventors: M. Jay Parks, Kirkland, WA (US); Jonas Fredrik Helin, Järfälla (SE)

(73) Assignee: Microsoft Corporation, Redmond, WA (US)

( * ) Notice: Subject to any disclaimer, the term of this patent is extended or adjusted under 35 U.S.C. 154(b) by 860 days.

(21) Appl. No.: 10/171,269

(22) Filed: Jun. 13, 2002

(65) Prior Publication Data

US 2003/0233553 A1 Dec. 18, 2003

(51) Int. Cl.
*H01L 9/00* (2006.01)
(52) U.S. Cl. .................. 713/178; 713/600; 726/2; 726/26; 705/51; 705/59; 380/274
(58) Field of Classification Search ............... 713/178, 713/194, 400, 500, 502, 600; 380/255, 36, 380/274; 726/2–4, 26; 705/59, 51; 725/29
See application file for complete search history.

(56) References Cited

U.S. PATENT DOCUMENTS

| | | | | |
|---|---|---|---|---|
| 5,500,897 | A * | 3/1996 | Hartman, Jr. | 713/178 |
| 5,764,275 | A * | 6/1998 | Lappington et al. | 725/136 |
| 5,999,921 | A * | 12/1999 | Arsenault et al. | 705/410 |
| 6,182,219 | B1 * | 1/2001 | Feldbau et al. | 713/176 |
| 6,199,169 | B1 * | 3/2001 | Voth | 713/400 |
| 6,530,023 | B1 * | 3/2003 | Nissl et al. | 726/26 |
| 6,671,813 | B1 * | 12/2003 | Ananda | 726/3 |
| 6,728,880 | B1 * | 4/2004 | Sites | 713/178 |
| 2002/0038231 | A1 * | 3/2002 | Hasebe et al. | 705/8 |
| 2002/0056042 | A1 * | 5/2002 | van der Kaay et al. | 713/178 |
| 2003/0063750 | A1 * | 4/2003 | Medvinsky et al. | 380/277 |
| 2003/0204738 | A1 * | 10/2003 | Morgan | 713/194 |

OTHER PUBLICATIONS

Looi, M.H. et al., "A note on supplying a trusted clock via a secure device", *Computers & Security*, 1994, 13(7), 611-613.
Schubert, M. "Radio controlled standard clock uses digital correlation", *Elektronik*, 1997, 46(17), 86-91 (English language abstract provided).
Takura, A. et al., "A secure and trusted time stamping authority", *1999 Internet Workshop. IWS99(Cat. No. 99EX385),IEEE*, 1999, 88-93.

* cited by examiner

*Primary Examiner*—Kim Vu
*Assistant Examiner*—Yin-Chen Shaw
(74) *Attorney, Agent, or Firm*—Woodcock Washburn LLP

(57) ABSTRACT

A computing device has a running real-time secure clock adjustable only according to trusted time as received from an external trusted time authority, a time offset within which is stored a time value adjustable by at least one of the user and the trusted time authority, and a time display for displaying a running real-time display time calculated as the trusted time from the secure clock plus the stored time value in the time offset. Reference thus may be made to the secure clock to evaluate a temporal requirement without concern that the user has adjusted the secure clock to subvert the temporal requirement. The computing device sends a request for secure time and the trusted time authority sends same. The computing device receives the secure time, sets the secure clock according to same, and sends confirmation to the trusted time authority that the secure time has been received.

8 Claims, 6 Drawing Sheets

SECURE CLOCK ON COMPUTING DEVICE SUCH AS MAY BE REQUIRED IN CONNECTION WITH A TRUST-BASED SYSTEM

TECHNICAL FIELD

The present invention relates to a computing device or the like with a clock that is not adjustable by a user of the device but is adjustable by a trusted time authority or the like, where such trusted time authority ensures that the clock is set correctly. Such a clock may be required in a trust-based system that measures a temporal requirement against the clock.

BACKGROUND OF THE INVENTION

In a trust-based system, access to an entity such as digital content, a computer application, or the like, is restricted based on pre-defined access requirements. One type of access requirement is a temporal or time-based requirement. For example, a temporal requirement may be that access is granted only if the current time is before or after a pre-defined value.

Of course, to check such a temporal requirement, the trust-based system must refer to a clock. Typically, if the trust-based system is resident on a computing device, the clock referred to is also on the computing device, although the clock may also be elsewhere. At any rate, a problem exists in that a temporal requirement to be checked by a trust-based system may be subverted merely by setting the referred-to clock to a value that would satisfy the temporal requirement.

Accordingly, a need exists for a method and mechanism whereby a secure clock is present on a computing device and is adjustable only by way of an external trusted time authority. Thus, a user of the computing device cannot subvert a temporal requirement that is enforced by a trust-based system merely by falsely setting the clock on the computing device to satisfy such temporal requirement.

SUMMARY OF THE INVENTION

In the present invention, a computing device has a running real-time secure clock that can only be adjusted according to trusted time as received from a trusted time authority external to the computing device, whereby a user of the computing device cannot adjust the secure clock. The computing device also has a time offset within which is stored a time value that can be adjusted by at least one of the user and the trusted time authority, and a time display for displaying a running real-time display time to the user of such computing device. The display time is calculated as the trusted time from the secure clock plus the stored time value in the time offset. Reference thus may be made to the secure clock to evaluate a temporal requirement without concern that the user has adjusted the secure clock to subvert the temporal requirement.

The computing device sends a request for secure time and the trusted time authority sends same. The computing device receives the secure time, sets the secure clock according to same, and sends confirmation to the trusted time authority that the secure time has been received.

BRIEF DESCRIPTION OF THE DRAWINGS

The foregoing summary, as well as the following detailed description of the embodiments of the present invention, will be better understood when read in conjunction with the appended drawings. For the purpose of illustrating the invention, there are shown in the drawings embodiments which are presently preferred. As should be understood, however, the invention is not limited to the precise arrangements and instrumentalities shown. In the drawings.

DETAILED DESCRIPTION OF THE INVENTION

Computer Environment

Figure 1:
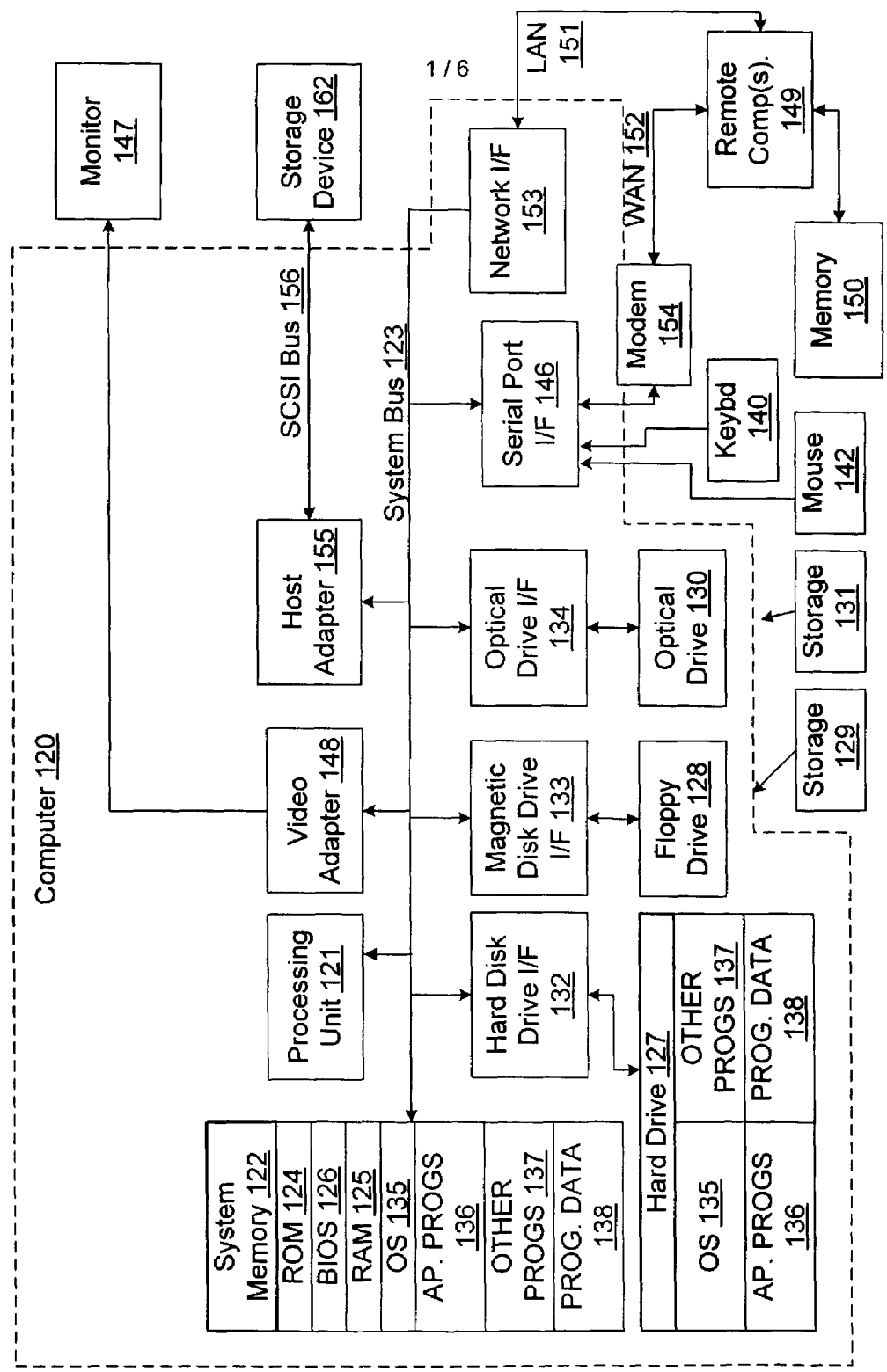
FIG. 1 is a block diagram representing a general purpose computer system in which aspects of the present invention and/or portions thereof may be incorporated.

FIG. 1 and the following discussion are intended to provide a brief general description of a suitable computing environment in which the present invention and/or portions thereof may be implemented. Although not required, the invention is described in the general context of computer-executable instructions, such as program modules, being executed by a computer, such as a client workstation or a server. Generally, program modules include routines, programs, objects, components, data structures and the like that perform particular tasks or implement particular abstract data types. Moreover, it should be appreciated that the invention and/or portions thereof may be practiced with other computer system configurations, including hand-held devices, multi-processor systems, microprocessor-based or programmable consumer electronics, network PCs, mini-computers, mainframe computers and the like. The invention may also be practiced in distributed computing environments where tasks are performed by remote processing devices that are linked through a communications network. In a distributed computing environment, program modules may be located in both local and remote memory storage devices.

As shown in FIG. 1, an exemplary general purpose computing system includes a conventional personal computer 120 or the like, including a processing unit 121, a system memory 122, and a system bus 123 that couples various system components including the system memory to the processing unit 121. The system bus 123 may be any of several types of bus structures including a memory bus or memory controller, a peripheral bus, and a local bus using any of a variety of bus architectures. The system memory includes read-only memory (ROM) 124 and random access memory (RAM) 125. A basic input/output system 126 (BIOS), containing the basic routines that help to transfer information between elements within the personal computer 120, such as during start-up, is stored in ROM 124.

The personal computer 120 may further include a hard disk drive 127 for reading from and writing to a hard disk (not shown), a magnetic disk drive 128 for reading from or writing to a removable magnetic disk 129, and an optical disk drive 130 for reading from or writing to a removable optical disk 131 such as a CD-ROM or other optical media. The hard disk drive 127, magnetic disk drive 128, and optical disk drive 130 are connected to the system bus 123 by a hard disk drive interface 132, a magnetic disk drive interface 133, and an optical drive interface 134, respectively. The drives and their associated computer-readable media provide non-volatile storage of computer readable instructions, data structures, program modules and other data for the personal computer 20.

Although the exemplary environment described herein employs a hard disk, a removable magnetic disk 129, and a removable optical disk 131, it should be appreciated that other types of computer readable media which can store data that is accessible by a computer may also be used in the exemplary operating environment. Such other types of media include a magnetic cassette, a flash memory card, a digital video disk, a Bernoulli cartridge, a random access memory (RAM), a read-only memory (ROM), and the like.

A number of program modules may be stored on the hard disk, magnetic disk 129, optical disk 131, ROM 124 or RAM 125, including an operating system 135, one or more application programs 136, other program modules 137 and program data 138. A user may enter commands and information into the personal computer 120 through input devices such as a keyboard 140 and pointing device 142. Other input devices (not shown) may include a microphone, joystick, game pad, satellite disk, scanner, or the like. These and other input devices are often connected to the processing unit 121 through a serial port interface 146 that is coupled to the system bus, but may be connected by other interfaces, such as a parallel port, game port, or universal serial bus (USB). A monitor 147 or other type of display device is also connected to the system bus 123 via an interface, such as a video adapter 148. In addition to the monitor 147, a personal computer typically includes other peripheral output devices (not shown), such as speakers and printers. The exemplary system of FIG. 12 also includes a host adapter 155, a Small Computer System Interface (SCSI) bus 156, and an external storage device 162 connected to the SCSI bus 156.

The personal computer 120 may operate in a networked environment using logical connections to one or more remote computers, such as a remote computer 149. The remote computer 149 may be another personal computer, a server, a router, a network PC, a peer device or other common network node, and typically includes many or all of the elements described above relative to the personal computer 120, although only a memory storage device 150 has been illustrated in FIG. 12. The logical connections depicted in FIG. 12 include a local area network (LAN) 151 and a wide area network (WAN) 152. Such networking environments are commonplace in offices, enterprise-wide computer networks, intranets, and the Internet.

When used in a LAN networking environment, the personal computer 120 is connected to the LAN 151 through a network interface or adapter 153. When used in a WAN networking environment, the personal computer 120 typically includes a modem 154 or other means for establishing communications over the wide area network 152, such as the Internet. The modem 154, which may be internal or external, is connected to the system bus 123 via the serial port interface 146. In a networked environment, program modules depicted relative to the personal computer 120, or portions thereof, may be stored in the remote memory storage device. It will be appreciated that the network connections shown are exemplary and other means of establishing a communications link between the computers may be used.

Trust-Based System

Figure 2:
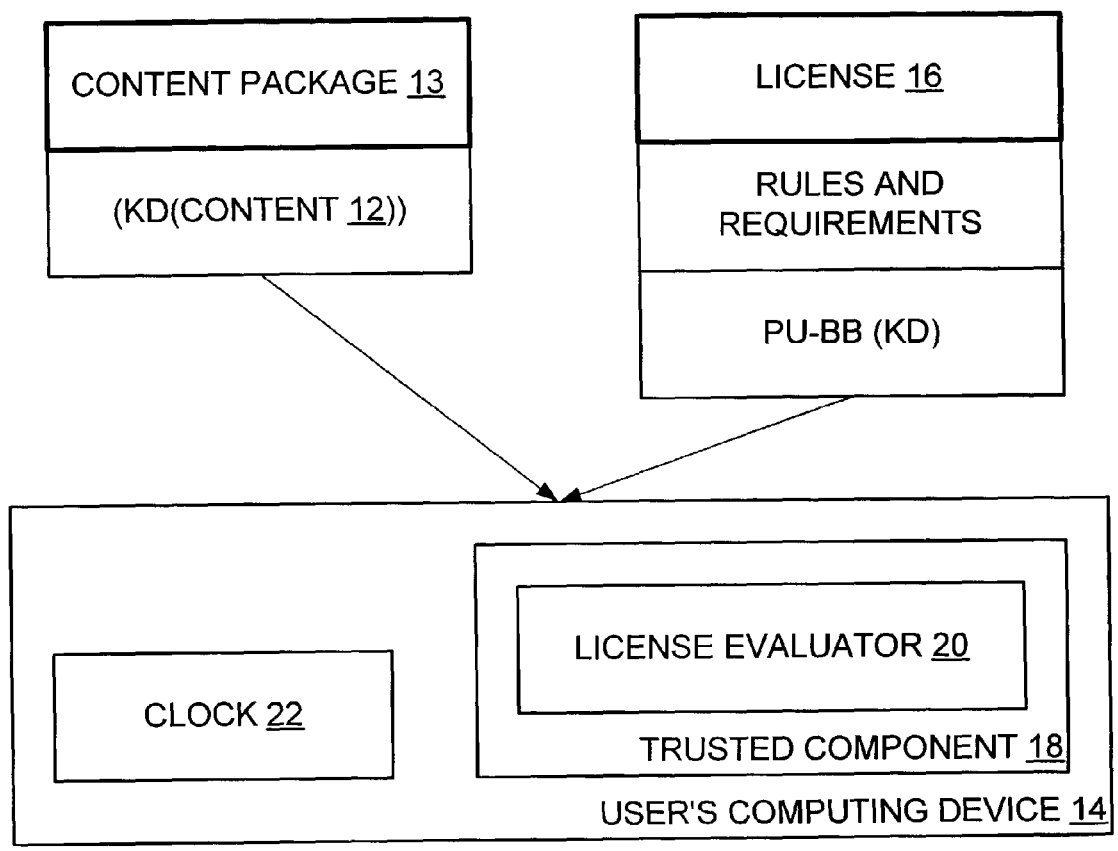
FIG. 2 is a block diagram showing an enforcement architecture of an example of a trust-based system.

Many examples of a trust-based system are known or should be apparent to the relevant public. Moreover, the present invention as disclosed herein may be employed with any such trust-based system without departing from the spirit and scope of the present invention. Referring now to FIG. 2, one example of a trust-based system is a digital rights management (DRM) system 10. As is known, such a DRM system 10 is highly desirable in connection with digital content 12 such as digital audio, digital video, digital text, digital data, digital multimedia, etc., where such digital content 12 is to be distributed to users. Upon being received by the user, such user renders or 'plays' the digital content with the aid of an appropriate rendering device such as a media player on a personal computer 14 or the like.

Typically, a content owner distributing such digital content 12 wishes to restrict what the user can do with such distributed digital content 12. For example, the content owner may wish to restrict the user from copying and re-distributing such content 12 to a second user, or may wish to allow distributed digital content 12 to be played only a limited number of times, only for a certain total time, only on a certain type of machine, only on a certain type of media player, only by a certain type of user, etc.

However, after distribution has occurred, such content owner has very little if any control over the digital content 12. A DRM system 10, then, allows the controlled rendering or playing of arbitrary forms of digital content 12, where such control is flexible and definable by the content owner of such digital content. Typically, content 12 is distributed to the user in the form of a package 13 by way of any appropriate distribution channel. The digital content package 13 as distributed may include the digital content 12 encrypted with a symmetric encryption/decryption key (KD), (i.e., (KD(CONTENT))), as well as other information identifying the content, how to acquire a license for such content, etc.

The trust-based DRM system 10 allows an owner of digital content 12 to specify license rules that must be satisfied before such digital content 12 is allowed to be rendered on a user's computing device 14. Such license rules can include the aforementioned temporal requirement, and may be embodied within a digital license 16 that the user/user's computing device 14 (hereinafter, such terms are interchangeable unless circumstances require otherwise) must obtain from the content owner or an agent thereof. Such license 16 also includes the decryption key (KD) for decrypting the digital content, perhaps encrypted according to a key decryptable by the user's computing device.

The content owner for a piece of digital content 12 must trust that the user's computing device 14 will abide by the rules and requirements specified by such content owner in the license 16, i.e. that the digital content 12 will not be rendered unless the rules and requirements within the license 16 are satisfied. Preferably, then, the user's computing device 14 is provided with a trusted component or mechanism 18 that will not render the digital content 12 except according to the license rules embodied in the license 16 associated with the digital content 12 and obtained by the user.

The trusted component 18 typically has a license evaluator 20 that determines whether the license 16 is valid, reviews the license rules and requirements in such valid license 16, and determines based on the reviewed license rules and requirements whether the requesting user has the right to render the requested digital content 12 in the manner sought, among other things. As should be understood, the license evaluator 20 is trusted in the DRM system 10 to carry out the wishes of the owner of the digital content 12 according to the rules and requirements in the license 16, and the user should not be able to easily alter such trusted element for any purpose, nefarious or otherwise.

As should be understood, the rules and requirements in the license 16 can specify whether the user has rights to render the digital content 12 based on any of several factors, including who the user is, where the user is located, what type of computing device the user is using, what rendering application is calling the DRM system, and most relevant to the present invention, the date, the time, etc. In addition, the rules and requirements of the license 16 may limit the license 16 to a pre-determined number of plays, or pre-determined play time, for example.

The rules and requirements may be specified in the license 16 according to any appropriate language and syntax. For example, the language may simply specify attributes and values that must be satisfied (DATE must be later than X, e.g.), or may require the performance of functions according to a specified script (IF DATE greater than X, THEN DO . . . , e.g.).

Upon the license evaluator 20 determining that the license 16 is valid and that the user satisfies the rules and requirements therein, the digital content 12 can then be rendered. In particular, to render the content 12, the decryption key (KD) is obtained from the license 12 and is applied to (KD (CONTENT)) from the content package 13 to result in the actual content 12, and the actual content 12 is then in fact rendered.

Secure Clock and Trusted Time Authority

As discussed above, a license 16 for a piece of content 12 may include therein a temporal requirement or restriction, such as for example that the content 12 cannot be rendered before and/or after a certain time. Accordingly, reference may be made during license evaluation to a clock on the computing device 14 for a current time. However, and importantly, a user may subvert such a temporal restriction merely by falsely setting the clock on the computing device 14 to a time that satisfies the temporal restriction.

Figure 3:
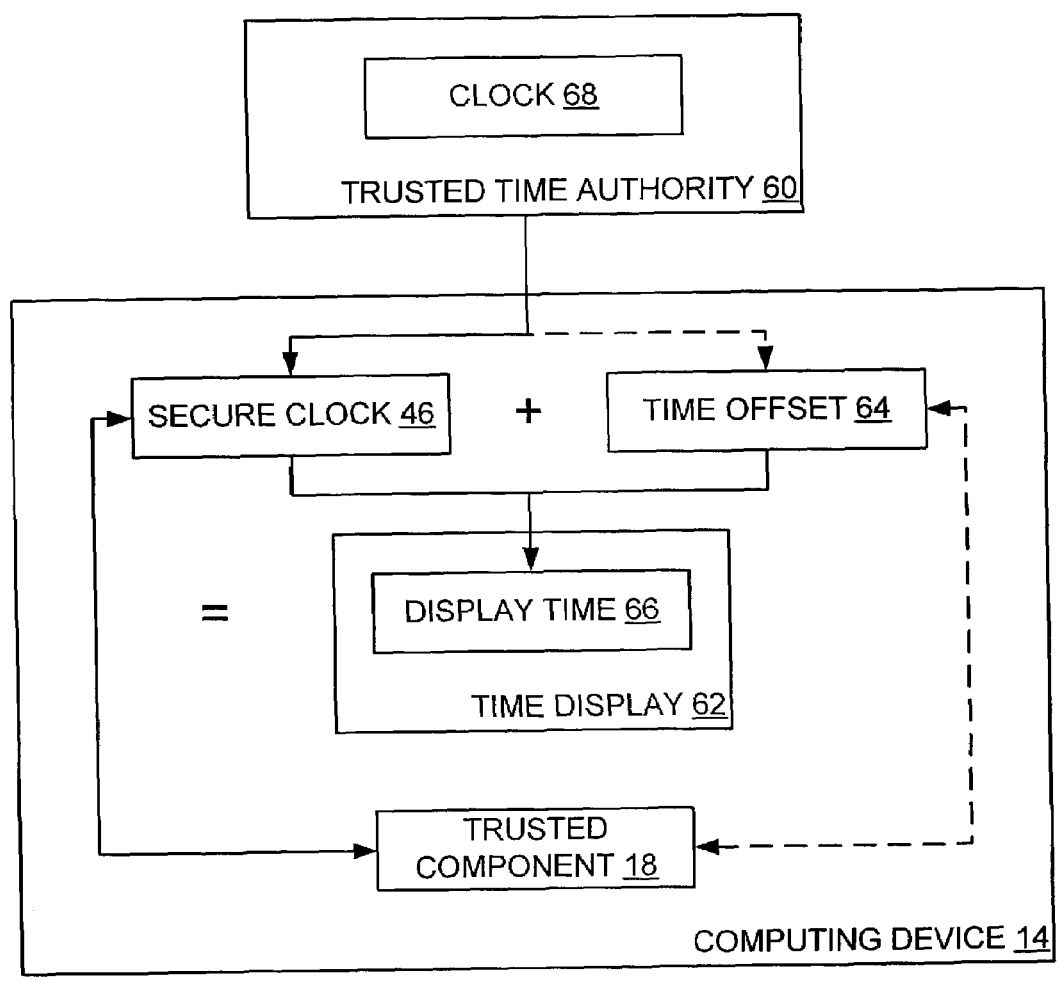
FIG. 3 is a block diagram showing a system clock as a secure clock that is adjustable only in accordance with trusted time as received from a trusted time authority, in accordance with one embodiment of the present invention.

Thus, in one embodiment of the present invention, and referring now to FIG. 3, the clock referred to by the license evaluator 20 of the DRM system 10 or referred to by any element of a trust-based system to evaluate temporal license requirements is a running real-time secure clock 22 that cannot be adjusted by the user. Instead, the secure clock 22 can only be adjusted according to trusted time as received from a trusted time authority 60 that is external to the computing device 14. Such trusted time authority 60 may be any appropriate entity without departing from the spirit and scope of the present invention. For example, the trusted time authority 60 may be represented by a server coupled to the computing device 14 by way of a network such as a LAN, a WAN, the Internet, an Intranet, or the like.

As should be appreciated, the trusted time authority 60 maintains trusted time in any appropriate convention, and the secure clock 22 on the computing device 14 is adjusted to such trusted time, either by the trusted time authority 60, the computing device 14, the trusted component 18 thereon, or the like. Trusted time may be kept with respect to a particular time zone or an absolute time—for example, Eastern U.S. time, coordinated universal time (UTC), astronomical time, etc. Such trusted time typically includes date information and time of day information, and is expressed according to a recognizable convention. For example, trusted time at 1:23:46 PM on Apr. 11, 2002, UTC, may be expressed as 20020411132346Z, where 2002 represents the year, 04 represents April, 11 represents the day, 13 represents the hour, 23 represents the minute, 46 represents the second, and Z represents UTC. Of course, any appropriate convention for trusted time may be employed without departing from the spirit and scope of the present invention.

Notably, a computing device 14 with a secure clock 22 may have an appropriate time display 62 for displaying time to a user of such computing device 14. Of course such time display 62 may be any appropriate display 62 without departing from the spirit and scope of the present invention, such as for example an LED or LCD display or an on-screen display. However, the trusted time as maintained by the secure clock 22 may not necessarily be amenable for displaying on the time display 62. For example, if trusted time is maintained according to the UTC convention and the user is in the United States Eastern time zone (ET), the trusted time may actually be 4 or 5 hours ahead of local time for the user.

Accordingly, in one embodiment of the present invention, the computing device 14 also has a time offset 64 within which is a time value that may be adjustable by the user. Thus, the computing device 14 can calculate a running real-time display time 66 equal to the trusted time on the secure clock 22 plus the time value in the time offset 64, where the display time 66 is displayed in the time display 62 of the computing device. Notably, while the user can adjust the time value in the time offset 64 to adjust the display time 66 shown in the display 62, such user cannot likewise adjust the trusted time as maintained in the secure clock 22. Thus a trust-based system such as the DRM system 10 can refer to the secure clock 22 for trusted time without fear that such trusted time has somehow been modified by a user who may wish to subvert a temporal requirement in a license 16.

While the user may adjust the time value in the time offset 64, such a capability is not a requirement of the present invention. In fact, in one embodiment of the present invention, the time value in the time offset 64 is limited to one or more pre-determined values such as may correspond to time differences that arise from time zones or the like. In addition, the time value in the time offset 64 may be controlled by the trusted time authority 60, the computing device 14, the DRM system 10 or other trust-based system, or the like.

In one embodiment of the present invention, the trusted component 18 on the computing device 14 is employed to receive trusted time from the trusted time authority 60. Thus, encryption-based signing and verification keys are employed by the trusted component 18 and the trusted time authority 60 to produce signed messages and/or certificates that that may be verified as being valid.

At some point during operation of the trusted component 18 and/or the computing device 14, it may be determined that the secure clock 22 must be set according to trusted time as received from the trusted time authority 60. Such a determination may be made by the trusted time authority 60, the computing device 14, the trusted component 18, and/or the like without departing from the spirit and scope of the present invention. However the determination is made, though, only the trusted time authority 60 should be capable of actually initiating the setting of the secure clock 22. Otherwise, if the trusted component 18 or the computing device 14 could initiate such setting of the secure clock 22, the possibility exists that a nefarious entity could force such an initiation to set the secure clock 22 to a time other than a secure time. Note, though, that such trusted component 18 or computing device 14 could ask the trusted time authority 60 to initiate without departing from the spirit and scope of the present invention.

Figure 4:
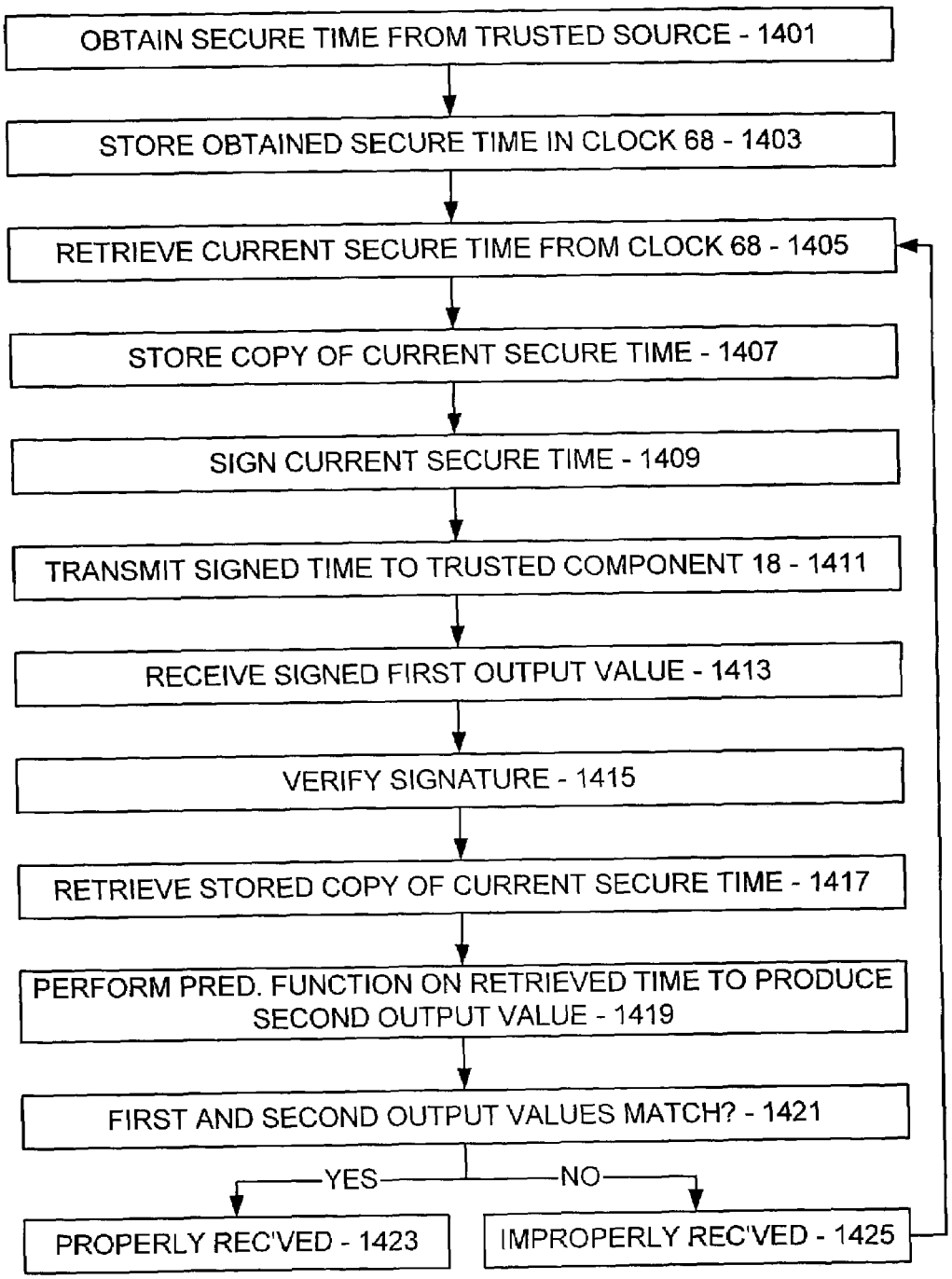
FIG. 4 is a flow diagram showing steps performed by the trusted time authority of FIG. 3 in adjusting the secure clock of FIG. 3 in accordance with one embodiment of the present invention.

Regardless of how or when the determination is made, in one embodiment of the present invention the secure clock 22 is set by having the trusted time authority 60 send a new secure time for the secure clock 22 of the computing device 14, and then receiving in response a confirmation that the secure clock 22 has been set with the new secure time. In particular, a method for setting the secure clock 22 is as follows:

Preliminarily, and turning now to FIG. 4, the trusted time authority 60 at some point obtains secure time from a trusted source (step 1401). Such trusted source for example may be from an atomic clock as maintained by a timekeeping organization such as the National Institute of Standards and Technology, although any other trusted source of time may be employed without departing from the spirit and scope of the present invention. Such obtaining of time may be done once each time secure time is to be set on a secure clock 22 of a computing device 14, or periodically, such as about once a day, once an hour, once a minute, etc. Such obtained secure time is then stored in a running real-time clock 68 (step 1403).

Figure 5:
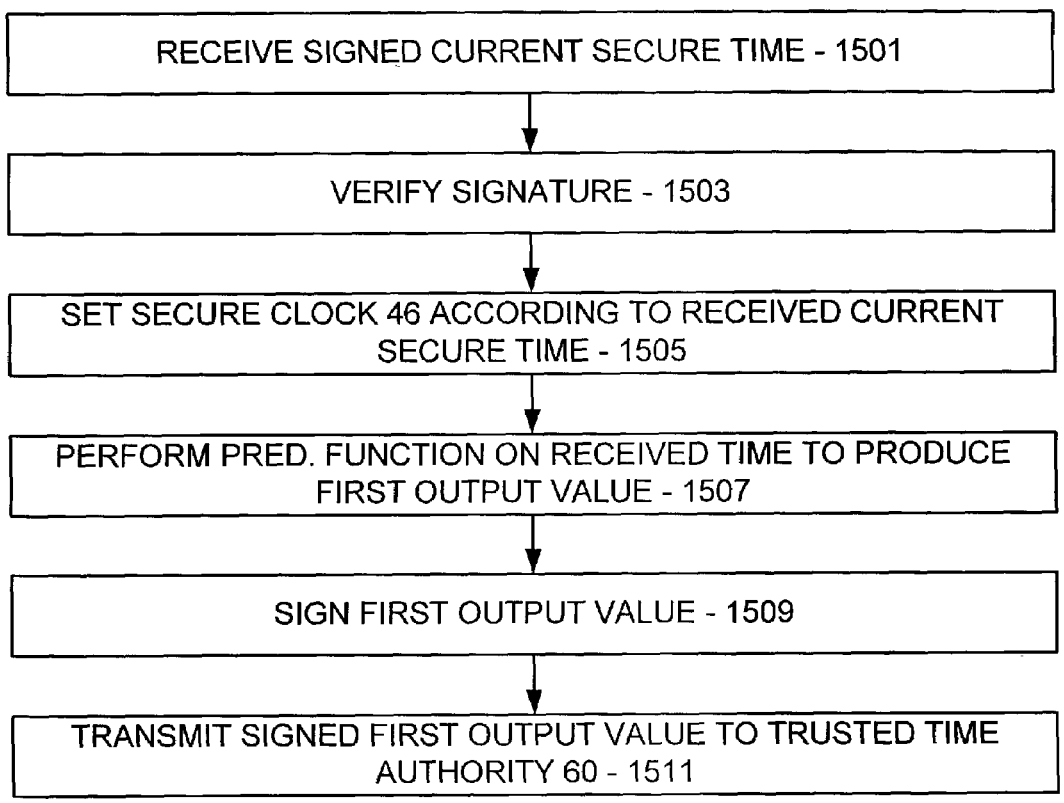
FIG. 5 is a flow diagram showing steps performed by the trust-based system of FIG. 1 or the like in adjusting the secure clock of FIG. 3 in accordance with one embodiment of the present invention.

Thereafter, in response to a request for secure time, the trusted time authority 60 retrieves a current secure time from the clock 68 (step 1405), stores a copy of the current secure time (step 1407), signs the current secure time (step 1409), and transmits the signed current secure time to the trusted component 18 at the computing device 14 (step 1411). Referring now to FIG. 5, the trusted component 18 thereafter receives the signed current secure time (step 1501) and verifies the signature (step 1503).

Assuming that the signature verifies, the trusted component 18 then sets the secure clock 22 according to the received current secure time (step 1505). Details of setting the secure clock 22 are known or should be apparent to the relevant public, and therefore any appropriate setting procedure may be performed without departing from the spirit and scope of the present invention. Presumably, the trusted component 18 is trusted to in fact set the secure clock 22 according to the received current secure time. Such trust may perhaps be enforced by having the trusted component 18 call a set clock routine with a password only available from the trusted time authority 60, where the password is protected from snooping by being encrypted according to a key known to the trusted component 18. Of course, any appropriate mechanism for protecting calls to the set clock routine may be employed without departing from the spirit and scope of the present invention.

In addition to setting the secure clock 22 with the received current secure time, the trusted component 18 takes the current secure time as received and performs a predetermined function thereon to result in first output value (step 1507). Such function may be any appropriate function without departing from the spirit and scope of the present invention, and is known to and performable by the trusted time authority 60.

The trusted component 18 then signs the first output value that resulted from the function (step 1509) and transmits the signed first output value to the trusted time authority 60 (step 1511). Referring again to FIG. 4, the trusted time authority 60 thereafter receives the signed first output value (step 1413) and verifies the signature (step 1415).

Assuming that the signature verifies, the trusted time authority 60 then retrieves the copy of the current secure time that was stored at step 1407 (step 1417), performs the predetermined function of step 1507 thereon to result in a second output value (step 1419), and compares the first and second output values (step 1421).

If the compare results in a match, the trusted time authority 60 determines that the current secure time as transmitted to the trusted component 18 was properly received (step 1423). Thereafter, the trusted time authority 60 may note same and/or inform the trusted component 18 of same, or simply end and do nothing else. If the compare results in a mismatch, the trusted time authority 60 determines that the current secure time as transmitted to the trusted component 18 was not properly received (step 1425), and may choose to return to step 1405 and again perform the process.

Figure 6:
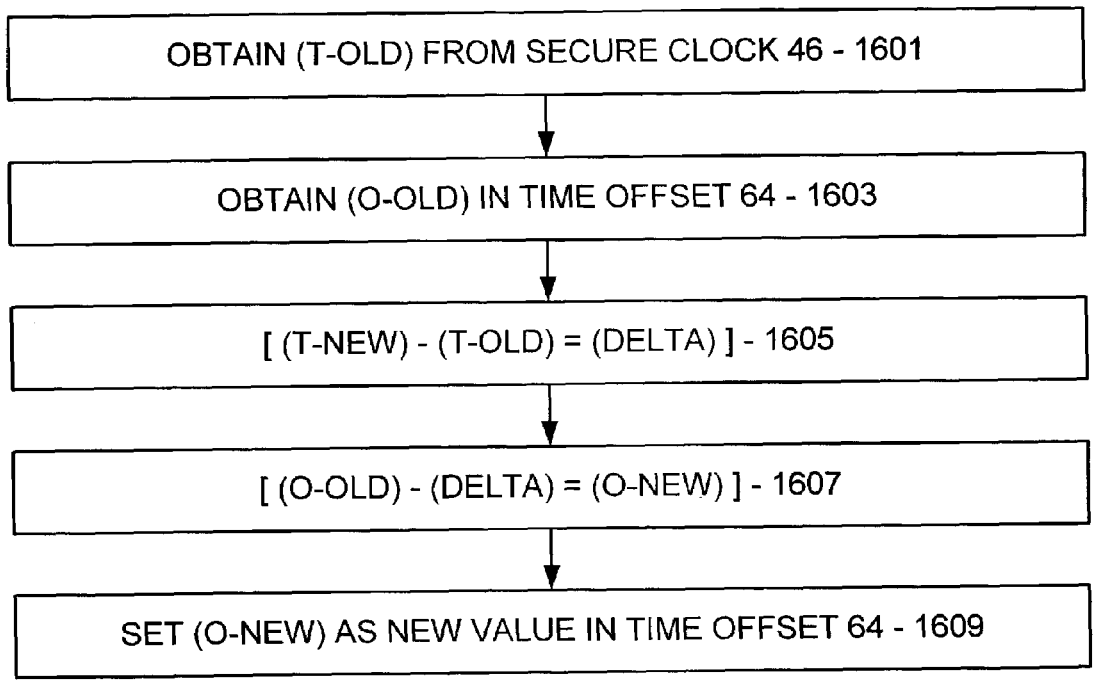
FIG. 6 is a flow diagram showing various steps performed in the course of adjusting the secure clock and a time offset to result in a non-changed display time in a time display in accordance with one embodiment of the present invention.

In one embodiment of the present invention, when the trusted component 18 sets the secure clock 22 according to the received current secure time as at step 1505, the time value in the time offset 64 is not changed with the result being that the display time 66 in the time display 62 changes according to the received current secure time. In another embodiment of the present invention, though, the trusted component 18 adjusts the time value in the time offset 64 such that the display time 66 in the time display 62 does not change. In particular, and as seen in FIG. 6, prior to setting the secure clock 22 according to the received current secure time (T-NEW), the trusted component 18 obtains the non-current secure time (T-OLD) from the secure clock 22 (step 1601), obtains the old time value (O-OLD) in the time offset 64 (step 1603), calculates (T-NEW) minus (T-OLD) as (DELTA) (step 1605), calculates (O-OLD) minus (DELTA) as a new time value (O-NEW) for the time offset 64 (step 1607), and sets (O-NEW) as the new time offset 64 (step 1609). As may be appreciated, in doing so, the display time 66 in the time display 62 does not change.

Note that when a computing device 14 having a secure clock 22 is initially powered on after a new install or full reset, such secure clock 22 should be set to some extremely inaccurate time, such as 19700101120000Z (12:00:00 am UTC on Jan. 1, 1970). Also, the trusted component 18 upon first examining the secure clock should recognize that the time is extremely inaccurate and thus request that the secure clock 22 be set according to trusted time as received from the trusted time authority 60, in the manner set forth above.

CONCLUSION

The programming necessary to effectuate the processes performed in connection with the present invention is relatively straight-forward and should be apparent to the relevant programming public. Accordingly, such programming is not attached hereto. Any particular programming, then, may be employed to effectuate the present invention without departing from the spirit and scope thereof.

In the foregoing description, it can be seen that the present invention comprises a new and useful method and mechanism whereby a secure clock 22 is present on a computing device 14 and is adjustable only by way of an external trusted time authority 60. Thus, a user of the computing device 14 cannot subvert a temporal requirement in a license 16 merely by falsely setting the clock 22 on the computing device 14 to satisfy such temporal requirement. It should be appreciated that changes could be made to the embodiments described above without departing from the inventive concepts thereof. Most importantly, the present invention may be employed in connection with any trust-based system, and not merely with a DRM system 10. It should be understood, therefore, that this invention is not limited to the particular embodiments disclosed, but it is intended to cover modifications within the spirit and scope of the present invention as defined by the appended claims.

The invention claimed is:

1. A method in combination with a computing device having a running real-time secure clock that a user of the computing device cannot adjust, the secure clock for maintaining trusted time employed to evaluate a temporal requirement without concern that the user has adjusted the secure clock to subvert the temporal requirement, the method for obtaining the trusted time from a trusted time authority external to the computing device and comprising the computing device in response to sending a request for secure time:
   receiving new secure time for the secure clock;
   setting the secure clock according to the received current secure time; and
   sending confirmation that the new secure time has been received,
   wherein the computing device further has a trusted component of a digital rights management (DRM) system for ensuring that digital content on the computing device is rendered only in accordance with a corresponding digital license on the computing device, the digital license including the temporal requirement, the method further comprising the trusted component referring to the secure clock to evaluate such temporal requirement without concern that the user has adjusted the secure clock to subvert the temporal requirement, the method comprising the trusted component sending the request for secure time to the trusted time authority, receiving the new secure time for the secure clock from the trusted time authority, setting the secure clock according to the received current secure time, and sending to the trusted time authority confirmation that the new secure time has been received,
   wherein the computing device further has a time offset within which is stored a time value that can be adjusted by the user, and a time display for displaying a running real-time display time to the user of such computing device, the display time being calculated as the trusted time from the secure clock plus the stored time value in the time offset, the method further comprising the computing device adjusting the time value in the time offset such that the display time in the time display does not change, by:
   obtaining a non-current secure time (T-OLD) from the secure clock;
   obtaining an old time value (O-OLD) in the time offset;
   calculating the received new secure time (T-NEW) minus (T-OLD) as (DELTA);
   calculating (O-OLD) minus (DELTA) as a new time value (O-NEW) for the time offset; and
   setting (O-NEW) as the new time value for the time offset, whereby the display time in the time display does not change.

2. The method of claim 1 wherein the trusted time authority upon receiving the request for secure time retrieves a current secure time from a running real-time authority clock and transmits the retrieved current secure time to the computing device, the method comprising the computing device thereafter:
   receiving the transmitted current secure time;
   setting the secure clock according to the received current secure time; and
   returning a representation of received current secure time to the trusted time authority, whereby the trusted time authority upon receiving the returned representation of the current secure time compares the returned representation of the current secure time with a like representation of the transmitted current secure time, determines that the current secure time as transmitted was properly received if the compare results in a match, and determines that the current secure time as transmitted was not properly received if the compare results in a mismatch.

3. The method of claim 2 wherein the trusted time authority upon receiving the request for secure time retrieves the current secure time from the running real-time authority clock, signs the current secure time, and transmits the signed current secure time to the computing device, the method comprising the computing device thereafter:
   receiving and verifying the signed current secure time;
   setting the secure clock according to the received current secure time, performing a predetermined function on the received current secure time to result in a first output value;
   signing the first output value, and
   returning the signed first output value to the trusted time authority, whereby the trusted time authority receives and verifies the signed first output value, performs the predetermined function on the retrieved current secure time to result in a second output value, compares the first and second output values, determines that the current secure time as transmitted was properly received if the compare results in a match, and determines that the current secure time as transmitted was not properly received if the compare results in a mismatch.

4. The method of claim 1 for obtaining the trusted time from a trusted time authority external to the computing device and comprising the computing device in response to sending a request for secure time:
   receiving new secure time for the secure clock;
   setting the secure clock according to the received current secure time; and
   sending confirmation that the new secure time has been received.

5. A computer-readable medium having stored thereon computer-executable instructions for performing a method in combination with a computing device having a running real-time secure clock that a user of the computing device cannot adjust, the secure clock for maintaining trusted time employed to evaluate a temporal requirement without concern that the user has adjusted the secure clock to subvert the temporal requirement, the method for obtaining the trusted time from a trusted time authority external to the computing device and comprising the computing device in response to sending a request for secure time:
   receiving new secure time for the secure clock;
   setting the secure clock according to the received current secure time; and sending confirmation that the new secure time has been received, wherein the computing device further has a trusted component of a digital rights management (DRM) system for ensuring that digital content on the computing device is rendered only in accordance with a corresponding digital license on the computing device, the digital license including the temporal requirement, the method further comprising the trusted component referring to the secure clock to evaluate such temporal requirement without concern that the user has adjusted the secure clock to subvert the temporal requirement, the method comprising the trusted component sending the request for secure time to the trusted time authority, receiving the new secure time for the secure clock from the trusted time authority, setting the secure clock according to the received current secure time, and sending to the trusted time authority confirmation that the new secure time has been received, wherein the computing device further has a time offset within which is stored a time value that can be adjusted by the user, and a time display for displaying a running real-time display time to the user of such computing device, the display time being calculated as the trusted time from the secure clock plus the stored time value in the time offset, the method further comprising the computing device adjusting the time value in the time offset such that the display time in the time display does not change, by:

obtaining a non-current secure time (T-OLD) from the secure clock;

obtaining an old time value (O-OLD) in the time offset;

calculating the received new secure time (T-NEW) minus (T-OLD) as (DELTA);

calculating (O-OLD) minus (DELTA) as a new time value (O-NEW) for the time offset; and setting (O-NEW) as the new time value for the time offset, whereby the display time in the time display does not change.

6. The medium of claim 5 wherein the trusted time authority upon receiving the request for secure time retrieves a current secure time from a running real-time authority clock and transmits the retrieved current secure time to the computing device, the method comprising the computing device thereafter:

receiving the transmitted current secure time;

setting the secure clock according to the received current secure time; and returning a representation of received current secure time to the trusted time authority, whereby the trusted time authority upon receiving the returned representation of the current secure time compares the returned representation of the current secure time with a like representation of the transmitted current secure time, determines that the current secure time as transmitted was properly received if the compare results in a match, and determines that the current secure time as transmitted was not properly received if the compare results in a mismatch.

7. The medium of claim 6 wherein the trusted time authority upon receiving the request for secure time retrieves the current secure time from the running real-time authority clock, signs the current secure time, and transmits the signed current secure time to the computing device, the method comprising the computing device thereafter:

receiving and verifying the signed current secure time;

setting the secure clock according to the received current secure time, performing a predetermined function on the received current secure time to result in a first output value;

signing the first output value, and returning the signed first output value to the trusted time authority, whereby the trusted time authority receives and verifies the signed first output value, performs the predetermined function on the retrieved current secure time to result in a second output value, compares the first and second output values, determines that the current secure time as transmitted was properly received if the compare results in a match, and determines that the current secure time as transmitted was not properly received if the compare results in a mismatch.

8. The medium of claim 5 wherein the method is for obtaining the trusted time from a trusted time authority external to the computing device and comprises the computing device in response to sending a request for secure time:

receiving new secure time for the secure clock;

setting the secure clock according to the received current secure time; and sending confirmation that the new secure time has been received.

* * * * *